DIGITAL LOGIC INFORMATION SIGNAL DISTRIBUTOR FOR MULTICHANNEL TELECOMMUNICATION SYSTEMS WHICH PASS ONLY ONE SIGNAL AT A TIME

Filed May 8, 1964 3 Sheets-Sheet 1

Luigi Sarati
and
Giorgio Imbrighi
INVENTORS

BY Irvin S. Thompson
ATTORNEY

Luigi Sarati
and
Giorgio Imbrighi
INVENTORS

BY Irwin S. Thompson
ATTORNEY

DIGITAL LOGIC INFORMATION SIGNAL DISTRIBUTOR FOR MULTICHANNEL TELECOMMUNICATION SYSTEMS WHICH PASS ONLY ONE SIGNAL AT A TIME

Filed May 8, 1964 3 Sheets-Sheet 3

*INVENTORS*
Luigi Sarati
Giorgio Imbrighi 3,398,296
Patented Aug. 20, 1968

3,398,296

DIGITAL LOGIC INFORMATION SIGNAL DISTRIBUTOR FOR MULTICHANNEL TELECOMMUNICATION SYSTEMS WHICH PASS ONLY ONE SIGNAL AT A TIME

Luigi Sarati, Milan, and Giorgio Imbrighi, Rho, Milan, Italy, assignors to Società Italiana Telecomunicazioni Siemens S.p.A.

Filed May 8, 1964, Ser. No. 366,116
Claims priority, application Italy, May 10, 1963, 34,862/63
4 Claims. (Cl. 307—207)

ABSTRACT OF THE DISCLOSURE

An information signal distributor suited to multichannel telecommunication systems with *m* routing channels and one reserve channel. The requirement of the reserve channel may be made for any one of the routing channels through a primary order or a secondary order signal depending on the gravity of the failure. When a few signals of primary and secondary order requiring the reserve channel arrive one after the other but then persist together, the information distributor lets pass only one signal by choosing the signal with regard to the arrival precedence and by giving the absolute precedence to the secondary order signal.

This invention relates to intelligence signal distributors and, more particularly, to distributors employing semiconductors for routing a single signal at a time from two groups of different weight signals.

In the prior art concerning the transmission of information, distribution devices are often utilized for traffic distribution as coupling elements, which provide, in time succession, the transmission of information signals arriving simultaneously or not, on their inputs.

Electromechanical distributors are known, which have, however, the drawback of requiring relays and selector switches, or other low speed means, which reduce the speed of the distribution operations. The field of application of these distributors is therefore limited when high speed operations are required. Other drawbacks existing in electromechanical distribution systems result from poor reliability in the course of operation and the requirement of careful maintenance, which, obviously, causes an increase in expenses.

Electronic distributors, used up to the present time, offer, however, the advantage of handling the traffic at high speed, but generally employing electronic tubes, have high power supply requirements and are of very large size.

Semiconductor distributors, heretofore employed, require complex circuitry and may be used only as distributors for simultaneous information signals of the same weight.

It is the principal object of the invention to provide an improved semiconductor distributor.

In accordance with the present invention, the semiconductor distributor is designed to conform to the modular technique of logic circuitry. Only two types of semiconductor modules are employed: AND circuits and TRL circuits. As known in the art an AND circuit will provide an output condition "0," when any of its input conditions is "0," and an output condition "1," when all of its input conditions are "1." As disclosed in Digital Computer Design Fundamentals, by Jaohan Chu, published by McGraw-Hill Book Company, Inc., pp. 196–198, a TRL, or "transistor-resistor logic," circuit may operate as a NOR circuit for a plurality of inputs and as an inverter circuit for a single input. As a NOR circuit, the TRL will provide output condition "0," if condition "1" exists on any of its inputs, and output condition "1," if condition "0" exists on all of its inputs. When the TRL functions as an inverter, the output condition will be the opposite of the input condition. Because only two types of modules are utilized, the distributor of the invention is, from a production point of view, less expensive and simpler to manufacture than other types heretofore used.

A further object of the present invention lies in providing an information distributor which allows the routing of only one information signal among a series of privileged information signals with respect to a second series of information signals which arrive simultaneously with said first information series at the distributor.

More exactly, the object of the present invention lies in providing an information distributor for "*n*" information signals, which comprises *n*/2 routing channels arranged to permit, as a whole, the routing of only one information signal at a time, selected between two information signal groups of different weight. The distributor is at least provided with a blocking circuit adapted to supply two breaking information signals employed for stopping the transit of primary order and both order information, respectively. The routing channel of said distributor comprises a first AND circuit A*i*1 which receives on two of its inputs the useful primary order information signal E*i*1 and the partial blocking information signal B*n*, respectively. Said first AND circuit A*i*1 is connected to a first input of a first TRL circuit T*i*1, the output of which is connected to the input of a second TRL circuit T*i*2 and to the input of the primary AND circuit of the remaining *n*/2—1 routing channels CT*i*.

A second AND circuit A*i*2 is provided in said routing channel and receives on two of its inputs the useful primary order information signal E*i*2 and the whole blocking information signal B*h*, respectively; the output of said second AND circuit A*i*2 is connected to the input of a third TRL circuit T*i*3 and, simultaneously, to the second input of said first TRL circuit T*i*1, the output of said third TRL circuit T*i*3 being connected to the input of the second AND circuit of the remaining (*n*/2—1) routing channels CT*i*.

The foregoing and other objects, advantages, and features of the invention and the manner in which the same are accomplished will become more readily apparent upon consideration of the following detailed description of the invention taken in conjunction with the accompanying drawings, which illustrate a preferred and exemplary embodiment, and wherein.

The operation of the distributor is such that, signal U*i*, present at the distributor output, can be expressed by the following equation:

$$U_i=E_i\cdot\bar{B}\cdot\overline{\sum_{n=1}^{n=(i-1)}U_n}+\overline{\sum_{n=(i+1)}^{n=m}U_n}+CU_i \qquad (1)$$

which, in the case of intelligence signals having preference in decay order (E*i* more important than $E_{i+1}$), is expressed by equation $$U_i=E_i\cdot\bar{B}\ \overline{\sum_{n=1}^{n=(i-1)}U_n}+CU_i \qquad (2)$$

Figure 5:
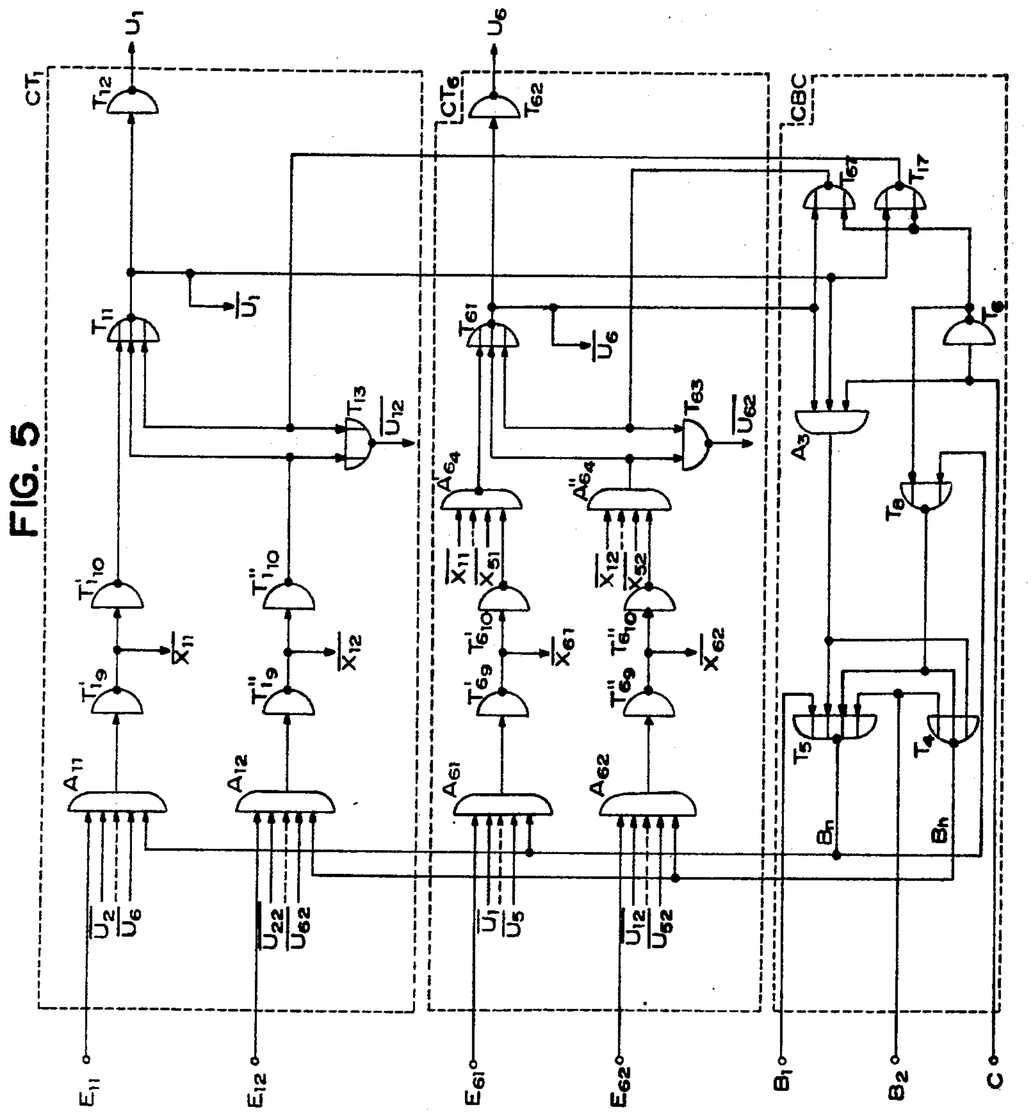
FIGURE 5 shows the entire circuit of a distributor, in accordance with the instant invention, comprising all the circuits shown in the preceding figures.

The primary order intelligence signals (E*i*1), which arrive on the distributor or logic *x*-pole, of FIG. 5, carry the same weight; therefore, it is unnecessary to set a preference criterion.

Intelligence signals E*i*2 carry a weight different from the preceding information signals; therefore, the former are preferred with respect thereto.

Under the above conditions, as two different weight intelligence signals arrive on each routing channel, it is more convenient to assume that signal U*i*, appearing at its output, is obtained by the addition of two signals U*i*1 and U*i*2 which correspond to the two input signals E*i*1 and E*i*2, respectively.

This makes it possible to define the operation of the logic *n*-pole by means of the existence field of condition U*i*=1, defined in the following table:

routing channels are set with a preferential decay order, relating to information E*i*2, becomes:

$$U_i=E_{i1}\left[\bar{B}_1\cdot\bar{B}_2\prod_{n=1}^{n=(i+1)}\bar{U}_n\prod_{n=(i+1)}^{n=m}\bar{U}_n\right]+E_{i2}\bar{B}_2\prod_{n=1}^{n=(i-1)}\bar{U}_{n2} \qquad (7)$$

The routing channel CT*i* (FIG. 1), comprises a first AND circuit A*i*1 which receives on two of its inputs the useful primary order information E*i*1 and the partial blocking information B*n*, respectively.

The AND circuit A*i*1 is connected to the first input of a first TRL circuit T*i*1, the output of which is connected to the input of a second TRL circuit T*i*2 and also to the input of the first AND circuits of the remaining (*n*/2—1) routing channels. The output of said second TRL circuit T*i*2 itself becomes the output of the corresponding routing channel CT*i* of the distributor.

Figures 1, 2:
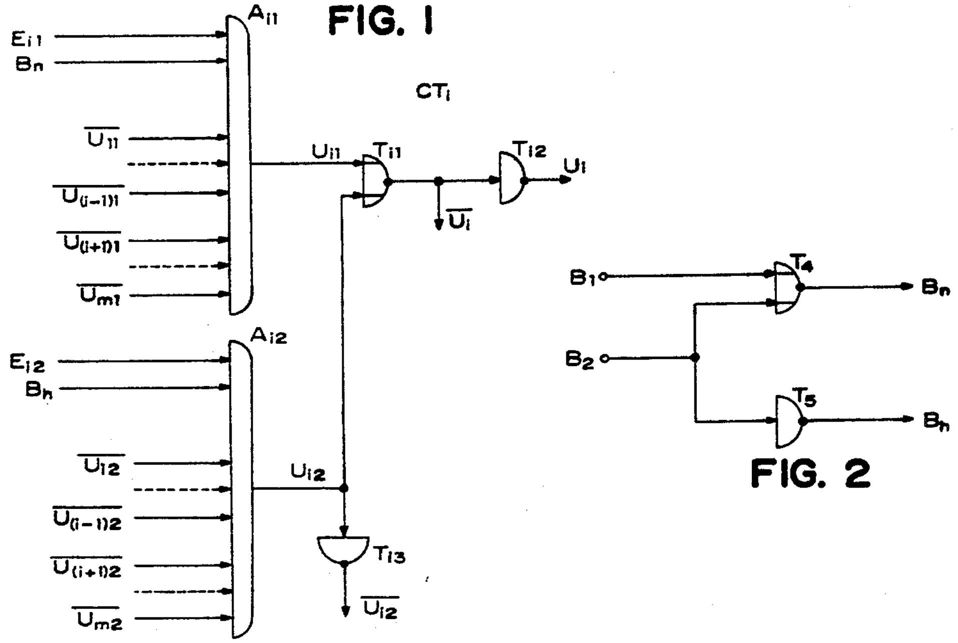
FIGURE 1 shows a simplified circuit arrangement comprising a generic routing channel CT*i* of an information distributor, in accordance with the present invention.
FIGURE 2 shows a blocking circuit for stopping intelligence signals from reaching the routing channel inputs of FIG. 1, when a "waiting" operation is not required.

The circuit arrangement of the routing channel shown in FIG. 1, further comprises a second AND circuit A*i*2, which receives on two of its inputs the useful secondary information E*i*2 and the whole blocking information B*h*, respectively. The output of said second AND circuit A*i*2 is connected to the input of the third TRL T*i*3 and, simultaneously, to a second input of the first TRL T*i*1. The output U*i*2 of third TRL T*i*3 is connected to an input of the second AND circuit of the remaining (*n*/2—1) routing channels.

From the above, it will be apparent that the operation of the *x*-pole or distributor is conditioned also by block-

| $B_1$ | $B_2$ | $E_{i1}$ | $E_{i2}$ | $\sum_{n=1}^{n=(i-1)} U_{n1}$ | $\sum_{n=(i+1)}^{n=m} U_{n1}$ | $\sum_{n=1}^{n=(i-1)} U_{n2}$ | $\sum_{n=(i+1)}^{n=m} U_{n2}$ |
|---|---|---|---|---|---|---|---|
| 0 | 0 | 1 | 0 | 0 | 0 | 0 | 0 |
| 0/1 | 0 | 0/1 | 1 | 0/1 | 0/1 | 0 | 0 |

from which Equation 3 is obtained:

$$U_i=E_{i1}\left[\bar{B}_1\cdot\bar{B}_2\ \overline{\sum_{n=1}^{n=(i-1)}U_{n1}}\cdot\overline{\sum_{n=(i+1)}^{n=m}U_{n1}}\cdot\overline{\sum_{n=1}^{n=(i-1)}U_{n2}}\cdot\overline{\sum_{n=(i+1)}^{n=m}U_{n2}}\right]+E_{i2}\left[\bar{B}_2\ \overline{\sum_{n=1}^{n=(i-1)}U_{n2}}\cdot\overline{\sum_{n=(i+1)}^{n=m}U_{n2}}\right] \qquad (3)$$

which states the operation of a generic routing channel when that which is required to effect "waiting" operation is neglected. The word "waiting" is intended to indicate that previous conditions of the system remain unchanged, as will be explained hereinafter.

Having in mind De Morgan's theorem, the expression 3 can be written in the form:

ing signals B1, B2 which have the function of stopping the routing of primary and secondary order information and "waiting" signal C, respectively. Signals U*i* are conditioned by blocking information, as follows:

$$\left.\begin{aligned}U_{i1}&=(\overline{B_1+B_2})\\U_{i2}&=(\bar{B}_1)\end{aligned}\right\} \qquad (8)$$

$$U_i=E_{i1}\left[\bar{B}_1\cdot\bar{B}_2\cdot\prod_{n=1}^{n=(i-1)}\bar{U}_{n1}\prod_{n=(i+1)}^{n=m}\bar{U}_{n1}\cdot\prod_{n=1}^{n=(i-1)}U_{n2}\cdot\prod_{n=(i+1)}^{n=m}\bar{U}_{n2}\right]+E_{i2}\left[\bar{B}_2\prod_{n=1}^{n=(i-1)}\bar{U}_{n2}\cdot\prod_{n=(i+1)}^{n=m}\bar{U}_{n2}\right] \qquad (4)$$

Because of what was previously stated:

$$U_n=U_{n1}+U_{n2}$$

Therefore:

$$\bar{U}_n=\cdot\overline{U_{n1}+U_{n2}}=\bar{U}_{n1}\cdot\bar{U}_{n2} \qquad (5)$$

This permits expression 4 to be written in the form:

$$U_i=E_{i1}\left[\bar{B}_1\cdot\bar{B}_2\prod_{n=1}^{n=(i-1)}\bar{U}_n\cdot\prod_{n=(i+1)}^{n=m}\bar{U}_n\right]+E_{i2}\left[\bar{B}_2\cdot\prod_{n=1}^{n=(i-1)}\bar{U}_{n2}\cdot\prod_{n=(i+1)}^{n=m}U_{n2}\right] \qquad (6)$$

by which a great simplification in the AND circuit which relates to input signal B*i*1 is obtained.

Figure 3:
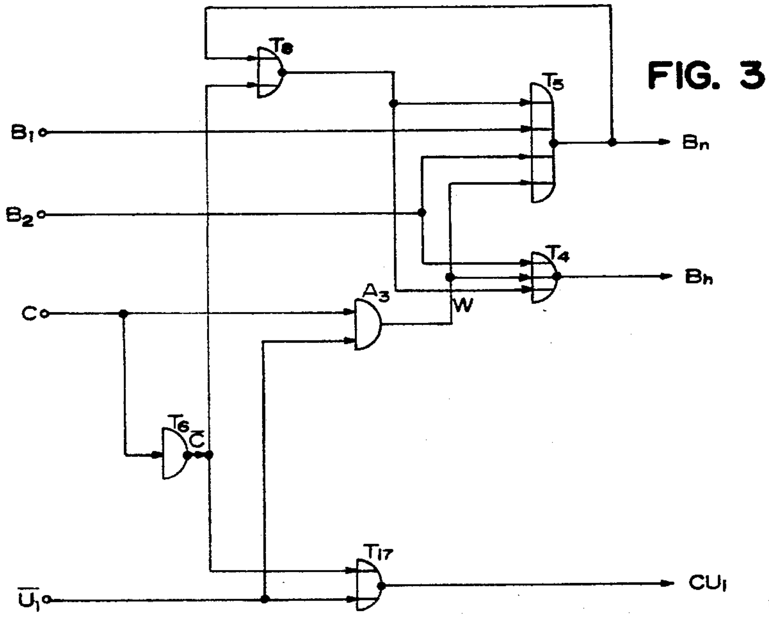
FIGURE 3 shows auxiliary blocking and "waiting" circuits to be used with the routing channel of FIG. 1.

FIG. 1 shows a generic routing channel CT*i*, characterized by the use only of modules AND and TRL, which operates as stated by Equation 6; the latter, when the The above function is embodied by the blocking circuit shown in FIG. 2 which comprises a fourth TRL circuit T4 disposed for receiving on two of its inputs, the routing blocking signal B1 of primary order information and the routing blocking signal B2 of secondary order, respectively. Signal B2 is further applied to a fifth TRL circuit T5 provided in the same blocking circuit. The partial blocking signal B*n* is taken out from the output of TRL circuit T4; while the whole blocking signal B*h* is taken out from the output of TRL circuit T5. Whenever a holding or "waiting" operation is desired in addition to a blocking operation, the situation present at the distributor's output must remain unaltered. In order to accomplish this, every channel must be driven by a feed-back circuit which permits the state of the outputs to be fed to the transit-channel inputs when a holding action is required by sending signal C. A circuit is provided, as shown in FIG. 3, for maintaining the situation unchanged also when, at the blocking moment, no signal is passing through the distributor. This latter possibility is embodied by an AND circuit which realizes the function:

$$W=C\prod_{n=1}^{n=m}\overline{U_n}=C\overline{\sum_{n=1}^{n=m}U_n} \quad (9)$$

Figure 4:
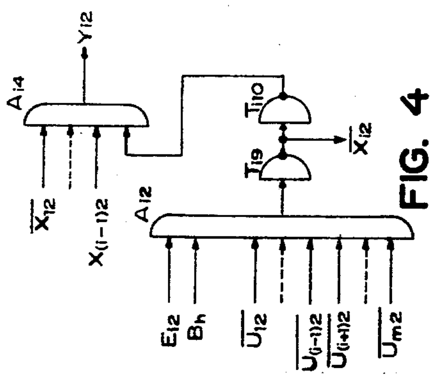
FIGURE 4 shows a progressive privilege circuit for applying simultaneous signals to each order circuit of the routing channel of FIG. 1.
Figure 6:
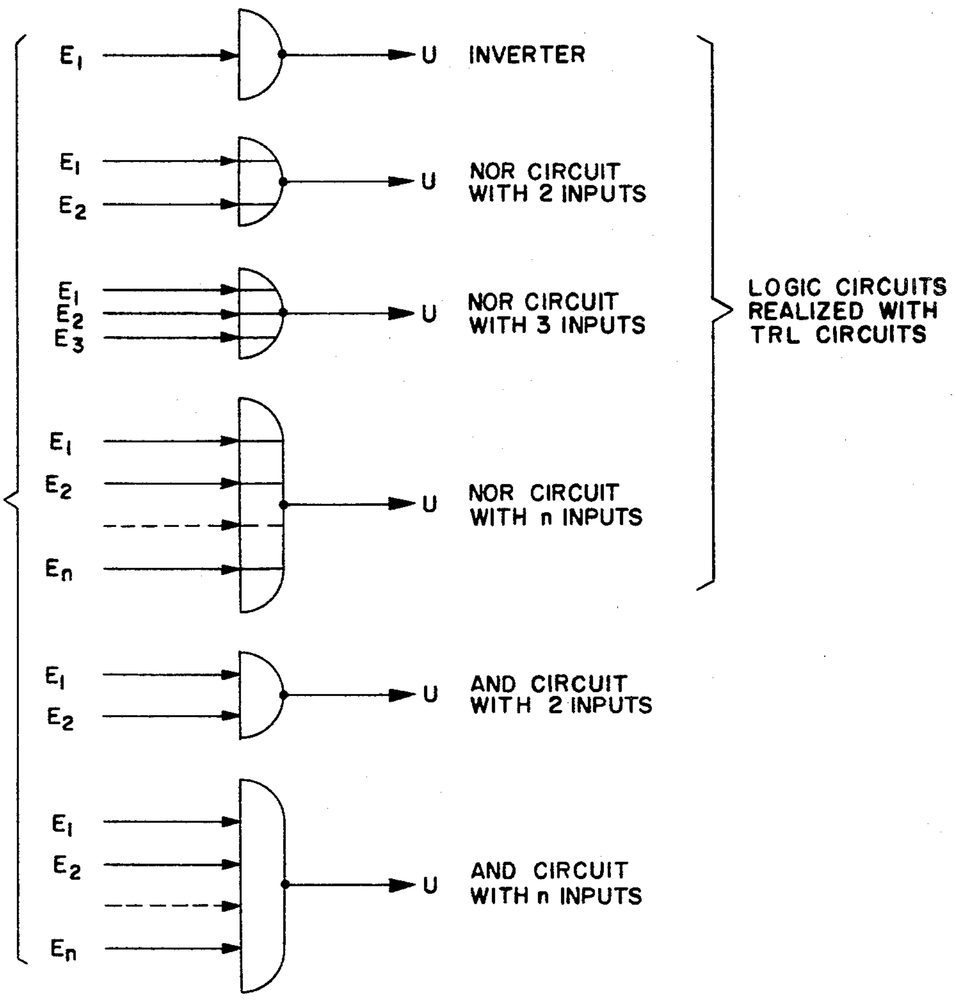
FIGURE 6 shows the various logic circuits utilized in FIGURES 1 through 5 and their respective functions.

By employing signal W in parallel with signal B2, the "waiting" condition is obtained when no routing is present, simulating a nonexisting blocking condition. The whole "blocking" and "waiting" circuits comprise a sixth TRL circuit T6, a seventh TRL T7 (or a seventh TRL circuit for each routing channel, belonging to the distributor or logic $x$-pole), an eighth TRL T8 and a third AND circuit A3. The waiting signal C is sent to the input of sixth TRL T6 and to an input of the AND circuit A3, respectively. Signal U*i*1 which arrives from the output of first TRL circuit T*i*1 of generic routing channel CT*i*, is applied to the input of the seventh TRL circuit T*i*7 and, simultaneously, to an input of AND circuit A3. Partial blocking signal B*n*, coming from TRL circuit T5 of the blocking circuit, is sent to an input of the eighth TRL T8. A signal coming from the output of sixth TRL T6, which is connected also to an input of the seventh TRL T*i*7, arrives on a second input of TRL T8. The output W of the third AND circuit A3 and the output of the eighth TRL circuit T8 are both connected to fourth TRL T4 and to fifth TRL T5 of the blocking circuit. Signal CU1 present on the output of seventh TRL T*i*7 is utilized to memorize the presence of a routing signal in the generic CT*i* channel, at the moment a "waiting" operation is requested. The circuit shown in FIG. 4 is a circuit with progressive privilege to be inserted in each generic routing channel CT*i* of the distributor. The function of said circuit is to transfer a single information signal to the output, when a plurality of signals arrive at the distributor simultaneously, and to provide instantaneously the simultaneous blocking of all other routing channels except the privileged one.

If, for example, X*i*2 designates the information pertaining to channels *i*2, present on the input of the relative privilege circuit and Y*i*2′ the information present on the output, it is necessary that the distributor channel be conditioned in accordance with the following equations:

$$\left.\begin{aligned} Y_{i2}&=X_{i2}\prod_{n=1}^{n=(i-1)}\overline{X_{n2}} \\ U_{i2}&=Y_{i2}\end{aligned}\right\}$$

and that route $Xi2\rightarrow\overline{Xi2}$ be shorter than route $Xi2\rightarrow\overline{Ui2}$ in order to effect the progressive privilege operation more rapidly than the automatic blocking operation. This is obtained by providing generic routing channel CT*i* with a ninth and a tenth TRL circuit T*i*9 and T*i*10, respectively (FIG. 4) and also with a fourth AND circuit A*i*4. The input of said ninth TRL T*i*9 is connected to the output of the second AND circuit A*i*2 of the generic routing channel CT*i*. Moreover, the output $\overline{Xi2}$ of TRL T*i*9 is connected both to TRL T*i*10 and fourth AND circuit A*i*4. In this manner, the output of TRL T*i*10 is connected to an input of the fourth AND circuit A*i*4, and the output Y*i*2 of the latter is connected to the input of the first TRL circuit T*i*1 of the generic rounting channel CT*i*, to which is applied the progressive privilege circuit, under observation.

FIG. 5 shows schematically the whole of the structure of the distributor in accordance with the invention, comprising all the circuit arrangements previously examined.

We will now explain the operation of the distributor in the following instances:

(*a*) *Primary order simultaneous information signals*

Let us assume that primary order information signals E11 and E61 arrive at the distributor of FIG. 5 and will be applied to AND circuits A11 and A61. This means, according to logic algebra symbology, that both outputs of these AND circuits carry a "1" condition and the output of TRL T′19 carries a "0" condition, the latter being connected to all the following channels, from CT2 (not appearing in the figure) to CT6, and to the AND circuits from A′24 (not shown) to A′64.

Owing to the fact that the input of AND A61 is affected in turn by information signal E61, the "1" condition is found also on the corresponding input of A′64, because information coming from A61 has been subjected to a double inversion through TRL T′69 and T′610.

As a result of the "0" condition at $\overline{X}$11, provided through the above-mentioned connection, a "0" condition will exist also on the output of A′64. Therefore, on one of the inputs of T61 the "0" condition exists, and on the other two inputs the "0" condition; this causes the appearance of condition "1" on the output of T61 and then of condition "0" on the output of T62, connected thereto.

Referring again to channel CT1, and more particularly to the output of TRL T′19, we find a "0" condition on this output; and on the output of T′110 a "1" condition will be present and be applied to one of inputs of T11. On the other two inputs of TRL T11, the "0" condition exists to be translated to a "0" condition at the output from T11 and then to a "1" condition on the output of T12.

(*b*) *Two simultaneous information signals of primary and secondary order, respectively*

It will be assumed now that information signals E11 and E62, respectively of primary and secondary order, arrive on the distributor. On the output of A62 a "1" condition is present and is translated by T″69 to the "0" condition and further to the "1" condition by T″610; consequently, condition "1" is present on the output of A″64 and is applied both to an input of T63 and to an input of T61, causing the appearance of "0" condition on the outputs of both said TRL circuits.

The output $\overline{U}$62 of T63 is connected to all the other secondary order AND circuits, blocking them. Also, the output $\overline{U}$6 of T61 is connected to all other primary order AND circuits and particularly also to A11, causing the appearance of a "0" condition on the output U1 of CT1, while, as condition "0" is present on the output of T61, by means of a subsequent inversion produced by T62, output U6 is activated.

(*c*) *Block of the situation described in paragraph* (*b*)

In the event that it is desired to block the situation reported in paragraph (*b*), signal B1 is sent to the distributor and the "0" blocking condition on the output of T5 is connected to all AND circuits, from A11 to A61 of the distributor itself; and the block of primary order individual routing channels is effected, whereby output U6 is still always activated.

If signal B2 is sent, the "0" condition will appear both at the output of T5 and T4; therefore, all the AND circuits of both orders are blocked.

(*d*) *"Waiting" condition for the presence of a secondary order information signal in transit*

In the case, by way of example, that a secondary order information signal, such as information signal E62, should be present on the input of the distributor, condition "0" will appear on the output of T61, which is applied to T67, on the output of which, will appear condition "1" which is in turn applied to one input of T63 and to an input of T61. It is obvious therefore that for the absence of an information signal E62, due to the presence of "waiting" signal C, the output U6 remains activated: in this case, in effect, the "0" condition is present on the output of A″64 and is applied both to one input of T61 and T63; but, as the "1" condition is present on a second input of T63, coming from T67, the output of T61 remains in the "0" condition and therefore output U6 of the distributor remains activated without alteration. It is obvious that output $\overline{U62}$ of T63, which maintains the block on all other AND circuits from A11, A12 to A61, A62 of the distributor, also remains unchanged.

(*e*) *"Waiting" condition in absence of routing information*

Let us assume that it is required to put in "waiting" a situation which presents no-information in transit through CT1 to CT6 of the distributor of FIG. 5.

Signal C is sent to the input of T6; and, after it has been inverted, it is applied to all TRL circuits from T17 to T67. A "1" condition which is present on the outputs of all TRL circuits from T11 to T61 is applied on a second input of these TRL circuits; therefore, condition "0" will be present again on the outputs of TRL circuits from T17 to T67. The outputs of said last TRL circuits are applied respectively to one of the inputs from T13 to T63 of the routing channels and to the inputs of TRL circuits from T11 to T61, simultaneously. No change appears in the output conditions from $\overline{U12}$ to $\overline{U62}$ and, similarly, in the conditions on the outputs from T11 to T61. Signal C arrives simultaneously on one of the inputs of AND A3; in the present case, condition "1" is found on the other inputs of A3; therefore the condition "1" appears on the output of A3 and, simulating a blocking condition, is applied to one of the inputs of TRL T4 and T5. The other inputs of these last TRL circuits are influenced by condition "0"; and therefore the condition "0" is present on the output thereof and effects the block of primary and secondary order AND circuits from A11, A12 to A61, A62; thereupon, any further information which should be present on the inputs of said AND circuits could not modify the situation on the output of the distributor.

(*f*) *"Waiting" operation of blocking circuit*

We are now considering the "waiting" operation of the blocking circuit. Signal B2 arrives on T5 and T4; therefore, on the outputs of said T5 and T4, the "0" condition which blocks all AND circuits from A11, A12 to A61, A62 will appear. When "waiting" signal C is sent, the condition "0" will appear on the output of T6; and this condition is applied to T8, on the second input of which, the condition "0", coming from the output of T5, is applied; thereby on the output of T8 the condition "1" will appear and is applied both to T4 and T5. When blocking signal B2 is absent, the condition on the output of T4 and T5 remains unchanged, because condition "1" of T8 is always present on T4 and T5; therefore on their outputs condition "0" is permanent, blocking all AND circuits from A11, A12 to A61, A62.

While a preferred embodiment of the invention has been shown and described, it will be apparent to those skilled in the art that changes can be made without departing from the principles and spirit of the invention, the scope of which is defined in the appended claims. Accordingly, the foregoing embodiments are to be considered illustrative rather than restrictive of the invention, and those modifications which come within the meaning and range of equivalency of the claims are to be included therein.

Having described our invention, we claim:

1. An information distributor for "2*m*" information signals (wherein *m* is a whole number greater or equal to two) comprising "*m*" routing channels, said routing channels being arranged, as a whole, to permit the routing of an information signal at a time chosen between two information signals groups; a primary order group with "*m*" information signals $E_{11}$ . . . $E_{1m}$ and a secondary order group with "*m*" information signals $E_{21}$ . . . $E_{2m}$ having precedence on any one signal of the primary order group; said information distributor including a blocking circuit means which supplies two breaking signals $B_n$, $B_n$, utilized respectively to stop the routing of primary order information signals and the routing of both primary and secondary order signals; a first routing channel comprising a first AND circuit having a plurality of inputs, said first AND circuit receiving a primary order information signal $E_{11}$ on one input of said plurality of inputs and a partial blocking information signal $B_n$ on a second one of said plurality of inputs, a first NOR circuit, a first inverter connected in series with a second inverter, said AND circuit being connected through said first and second inverters to an input of said first NOR circuit, a third inverter, $(m-1)$ routing channels, each routing channel having a respective first routing channel AND circuit having a plurality of inputs, the output of said NOR circuit being connected to both the input of said third inverter and to one of the inputs of said first routing channel AND circuits of the remaining routing channels, the output of said third inverter being the output from the distributor of the first routing channel, said first routing channel having a second AND circuit, said second AND circuit having a plurality of inputs, one of said second AND circuit inputs receiving a secondary order information signal $E_{12}$ and a second of said second AND circuit inputs receiving the whole blocking information signal $B_n$; a fourth and a fifth inverter connected in series, a second NOR circuit, the output of said second AND circuit being connected to the input of said fourth inverter and the output of said fifth inverter being simultaneously connected to the input of said second NOR circuit and to a second input of said first NOR circuit, said $(m-1)$ routing channels each having a respective second routing channel AND circuit, the output of said second NOR circuit being connected to the input of the second routing channel AND circuits of the remaining $(m-1)$ routing channels.

2. An information distributor according to claim 1, wherein said blocking circuit comprises when a "waiting" operation is not required a third NOR circuit receiving on its inputs a routing blocking signal of primary order information and a routing blocking signal of secondary order information respectively, said last signal being coupled also to a fourth NOR circuit, said partial blocking signal and said whole blocking signal being provided on the outputs of said third NOR circuit and said fourth NOR circuit respectively.

3. An information distributor as claimed in claim 2, which includes a "waiting" circuit comprising; a sixth inverter circuit, a fifth NOR circuit (one for each routing channel), a sixth NOR circuit and a third AND circuit; a waiting signal being sent simultaneously to the input of said sixth inverter circuit and to an input of said third AND circuit, signals coming from the outputs of said first NOR circuit of each routing channel being applied to an input of the fifth NOR circuits of each channel and simultaneously to an input of said third AND circuit, and the "partial" blocking signal coming from said blocking circuit being applied to an input of the sixth NOR circuit, the output of said sixth inverter circuit being connected to an input of the fifth NOR circuit and sixth NOR circuit, respectively, and the output of the third AND circuit and of the sixth NOR circuit being connected to said third and fourth NOR circuits of said blocking circuit, respectively; the output of the fifth NOR circuit being a disposable signal suitable for memorizing the presence of a routing signal in the respective channel at the moment a "waiting" operation is requested.

4. An information distributor according to claim 1, wherein the routing channels are provided with a circuit arrangement for giving a privilege to a first routing channel in the event that information signals arrive simultaneously at the input thereof and at the input of one or more successive channels; said circuit arrangement comprising in said first routing channel, said first and said second inverters and a third AND circuit for the primary order information signals, said fourth and fifth inverter circuits and a fourth AND circuit for the secondary order information signals; for primary order information signals said first inverter receiving the output coming from the first AND circuit and providing from its output the information received on the input of said second inverter and on the input of said fourth AND circuit, the other inputs of said fourth AND circuit being connected to the outputs coming from the respective first inverters pertaining to the previous ($m-1$) routing channels and the output of said third AND circuit being connected to the input of the first NOR circuit; for secondary order information signals said fifth inverter receiving the output coming from said second AND circuit and providing from its output the information received on the input of said fifth inverter and on the input of said fourth AND circuit; the other inputs of said fourth AND circuit being connected to the outputs coming from the respective fourth inverters pertaining to the previous ($m-1$) routing channels and the output of said fourth AND circuit being connected to the input of said first NOR circuit.

References Cited

UNITED STATES PATENTS

| | | | |
|---|---|---|---|
| 3,063,036 | 11/1962 | Reach et al. | 340—172.5 |
| 3,215,987 | 11/1965 | Terzian | 340—172.5 |

ARTHUR GAUSS, *Primary Examiner.*

R. H. PLOTKIN, *Assistant Examiner.*